US010637953B2

(12) United States Patent
Peng et al.

(10) Patent No.: US 10,637,953 B2
(45) Date of Patent: Apr. 28, 2020

(54) APPARATUS, SYSTEM AND METHOD FOR CACHE MANAGEMENT

(71) Applicants: Canon Information and Imaging Solutions, Inc., Melville, NY (US); Canon U.S.A., Inc., Melville, NY (US)

(72) Inventors: Jiayin Peng, College Point, NY (US); Daniel Doran, Yonkers, NY (US); Kosuke Nakashima, Kawasaki (JP)

(73) Assignees: CANON INFORMATION AND IMAGING SOLUTIONS, INC., Melville, NY (US); CANON U.S.A., INC., Melville, NY (US)

( * ) Notice: Subject to any disclaimer, the term of this patent is extended or adjusted under 35 U.S.C. 154(b) by 290 days.

(21) Appl. No.: 15/497,997

(22) Filed: Apr. 26, 2017

(65) Prior Publication Data

US 2017/0318115 A1 Nov. 2, 2017

Related U.S. Application Data

(60) Provisional application No. 62/329,735, filed on Apr. 29, 2016.

(51) Int. Cl.
*G06F 15/167* (2006.01)
*H04L 29/08* (2006.01)
(Continued)

(52) U.S. Cl.
CPC .......... *H04L 67/2842* (2013.01); *H04L 67/02* (2013.01); *H04L 67/10* (2013.01);
(Continued)

(58) Field of Classification Search
CPC ..... H04L 67/2842; H04L 67/32; H04L 67/10; H04L 67/02
See application file for complete search history.

(56) References Cited

U.S. PATENT DOCUMENTS 6,192,398 B1 2/2001 Hunt
6,289,382 B1 9/2001 Bowman-Amuah
(Continued)

OTHER PUBLICATIONS

The Chromium Projects, Print Preview: http://web.archive.org/web/20160402113203/http://www.chromium.org/developers/design-documents/print-preview (Apr. 2, 2016).
(Continued)

*Primary Examiner* — Yves Dalencourt
(74) *Attorney, Agent, or Firm* — Canon U.S.A., Inc. IP Division

(57) ABSTRACT

A server that receives, from an image processing device, a request indicating a data file stored on a file server and a predetermined type of processing to be performed on the data file. It is determined whether memory stores information associated with a current session between the image processing device and the server. Based on determining that the information is not stored, initiating a download of the data file, generating a modified version of the downloaded data file and storing the information associated with the current session in the memory. The modified version is provided to the image processing device if the predetermined type of processing is a first type of processing and the downloaded file to the image processing device if the predetermined processing is a second type of processing.

17 Claims, 9 Drawing Sheets

(51) Int. Cl.
*H04N 1/00* (2006.01)
*H04N 1/21* (2006.01)
*H04W 4/00* (2018.01)

(52) U.S. Cl.
CPC ......... *H04L 67/32* (2013.01); *H04N 1/00244* (2013.01); *H04N 1/00464* (2013.01); *H04N 1/00973* (2013.01); *H04N 1/2166* (2013.01); *H04W 4/00* (2013.01); *H04N 2201/0094* (2013.01)

(56) References Cited

U.S. PATENT DOCUMENTS

| | | | | |
|---|---|---|---|---|
| 7,840,894 | B2 | 11/2010 | Brown et al. | |
| 8,098,395 | B2 * | 1/2012 | Kitada | H04N 1/00244 358/1.1 |
| 8,826,126 | B1 | 9/2014 | Toscano et al. | |
| 9,311,039 | B2 | 4/2016 | Lee et al. | |
| 2011/0222105 | A1 | 9/2011 | Wang et al. | |
| 2014/0176992 | A1 | 6/2014 | Shi et al. | |
| 2015/0049360 | A1 | 2/2015 | Lee et al. | |
| 2015/0149586 | A1 | 5/2015 | Saito | |
| 2016/0313882 | A1 | 10/2016 | Brown et al. | |
| 2017/0200476 | A1 * | 7/2017 | Chen | G06F 16/21 |

OTHER PUBLICATIONS

Managing Software Cache—Remote Cache: http://documentation.commvault.com/commvault/v10/article?o=service_pack/remote_cache.htm (accessed on Mar. 16, 2016).

* cited by examiner

APPARATUS, SYSTEM AND METHOD FOR CACHE MANAGEMENT

CROSS-REFERENCE TO RELATED APPLICATIONS

This nonprovisional patent application claims priority from U.S. Provisional Patent Application Ser. No. 62/329,735 filed on Apr. 29, 2016, the entirety of which is incorporated herein by reference.

BACKGROUND OF THE INVENTION

Field of the Invention

The present invention relates generally to a server computing device, and more specifically, to a server computing device for managing a file cache.

Description of the Related Art

Image processing devices may include a plurality of different image processing functions. For example, an image processing device may include any one of a multifunction peripheral, copier, scanner, printer, or other image processing device, and provide the corresponding functionality. The image processing device enables a user to execute various functions, features, and user interfaces in order to perform particular tasks. By way of example, the image processing device and/or application executing on the image processing device may provide functionality for making photocopies, printing a document, scanning a document and generating an electronic document representing the scanned document, transmitting data over a network, accessing a database on a remote server, or other task. Image processing devices also are selectively connectable to a network. By connecting to a network, the image processing device may selectively access other external devices including, but not limited to other image processing devices and server computing systems having applications executing thereon. As image processing devices have grown in complexity and ability to offer many different types of functionality in different environments, the ability to control and operate the image processing devices have been updated to reflect these capabilities. It is not uncommon for image processing devices to have built-in display screens that present various options for controlling the operation of these devices. However, a drawback associated with these configurations relate to the ability to access or otherwise acquire information from a server computing system which may then be used by the image processing device. A system according to invention principles remedies any drawbacks associated with these conventional systems.

BRIEF SUMMARY OF THE INVENTION

Methods, systems, and computer-readable media for processing image file data are described.

In one embodiment, a server that manages memory cache is provided. The server includes a controller and a memory storing instructions that, when executed by the controller, control the server to execute a cache management application. The cache management application receives, from an image processing device, a request perform a predetermined type of processing on a data file stored on a file server. The application executes the predetermined processing in response to determining that a current session between the image processing device and the server includes information associated with the data file stored in the memory.

In another embodiment, in response to the application determining that the current session does not include information associated with the data file, initiating a download of the data file from the file server and stores information associated with the downloaded data file in memory and link the stored information with session information. The application then executes the predetermined processing.

In a further embodiment, the application generates a preview version of the data file stored in memory and stores, in memory, information identifying a location of the preview file and information identifying a location of the data file in combination with the session information. In a case where the predetermined processing is a preview processing, the application checks if current session information includes the information identifying a location of the preview file and provides the preview file to the image processing device for a print preview operation executed in a browser of the image processing device. In a case where the predetermined processing is a print operation, the application check if the current session information includes information associated with the data file and causes the data file to be transmitted to the image processing device to be output via a print operation.

In another embodiment a server is provided. The server includes a memory storing instructions and at least one processor that executes the instructions stored in the memory to control the at least one processor to perform operations. The server receives, from an image processing device, a request indicating a data file stored on a file server and a predetermined type of processing to be performed on the data file and determines whether the memory stores information associated with a current session between the image processing device and the server. The information identifies a location in the memory where the data file is stored and a location in the memory where a modified version of the data file is stored. Based on determining that the information is not stored in the memory, the server initiates a download of the data file from the file server, generates a modified version of the downloaded data file and provides the modified version to the image processing device if the predetermined type of processing is a first type of processing and provides the downloaded file to the image processing device if the predetermined processing is a second type of processing. The server further causes the memory to store the information associated with the current session. Based on determining that the memory stores the information, the server provides the modified version to the image processing device if the predetermined type of processing is the first type of processing and provides the downloaded file to the image processing device if the predetermined processing is the second type of processing.

In another embodiment, the server deletes at least one of the data file and the modified version of the data file during the session between the image processing device in response to (a) receiving a further request from the image processing device for a further data file and (b) upon completion of the predetermined processing.

In a further embodiment, the first type of processing is a print preview process and the modified version of the data file is a thumbnail including an amount of data less than the full version of the requested data file, and the second type of processing is print processing that provides a full version of the downloaded data file to the image processing device for output thereof.

In another embodiment, in response to completion of the first type of processing, a request for the second type of processing is selectively completed during a same session without re-downloading the requested file from the file server.

In certain embodiments, the file server is external from the server and includes a resource providing application that provides one or more requested files to the server in response to the request received from the image processing device based on user credentials received from the image processing device.

In other embodiments, the server manages requests for multiples data files received from the image processing device using session configuration information identifying a maximum allowance value for each session, the maximum allowance value representing a maximum number of files per session and a maximum size per file. The maximum allowance values may be dynamically determined based on the maximum number of simultaneous requests permitted by the server and a size of the memory allocated to storing data files.

In other embodiments, the server manages requests for multiples data files received from the image processing device by tracking a list of data files associated with the session and, in a case where the available memory is less than a size of the requested file, deleting one or more files based on an earliest request time until the available memory is larger than a size of the requested file, and in a case where the available memory is greater than a size of the requested file, maintaining, in memory, all previously requested files and downloading the requested file.

Further features of the present invention will become apparent from the following description of exemplary embodiments with reference to the attached drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

According to invention principles, a server has a cloud computing application that enables management and delivery of one or more hosted services executing thereon. The cloud computing application enables remote connection with a plurality of different type of devices and enables bidirectional communication between the server and the plurality of different types of devices. The server may include one or more network servers hosted on a wide area network (e.g. the Internet) to store, manage, and process data. Examples of cloud computing applications enable provision of various types of services to one or more users which advantageously reduce the need of the one or more users to build, maintain and manage a server of their own. Moreover, the cloud computing application enables the one or more users to access the application and any services provisioned thereby using any network connected device including computers, servers, smartphones, tablets or the like. The cloud computing application may generally be a control application that serves to manage and direct traffic between the server and any device and/or user accessing the server. Examples of cloud computing applications enable a plurality of different types of service models which include infrastructure as a service (IaaS), platform as a service (PaaS) and software as a service (SaaS). In an SaaS environment, applications are deployed on the cloud server and access to these applications is provided to one or more users and/or devices via client applications executing on their devices. This minimizes the need for individual users to install and maintain software on their devices. In order to ensure that a plurality of users/devices can simultaneously access the cloud server and any application deployed thereon, the cloud application advantageously provides load balancing functionality. The advantage of the SaaS model is entities who create or own the software available for use may selectively control access and improve the ability to recover costs from users who use the server based on the security and identification processes associated with a device accessing a server and being able to make use of one or more types of applications executing on the server and made available to the user/device over the network using the client application executing on the user's device.

Figure 1:
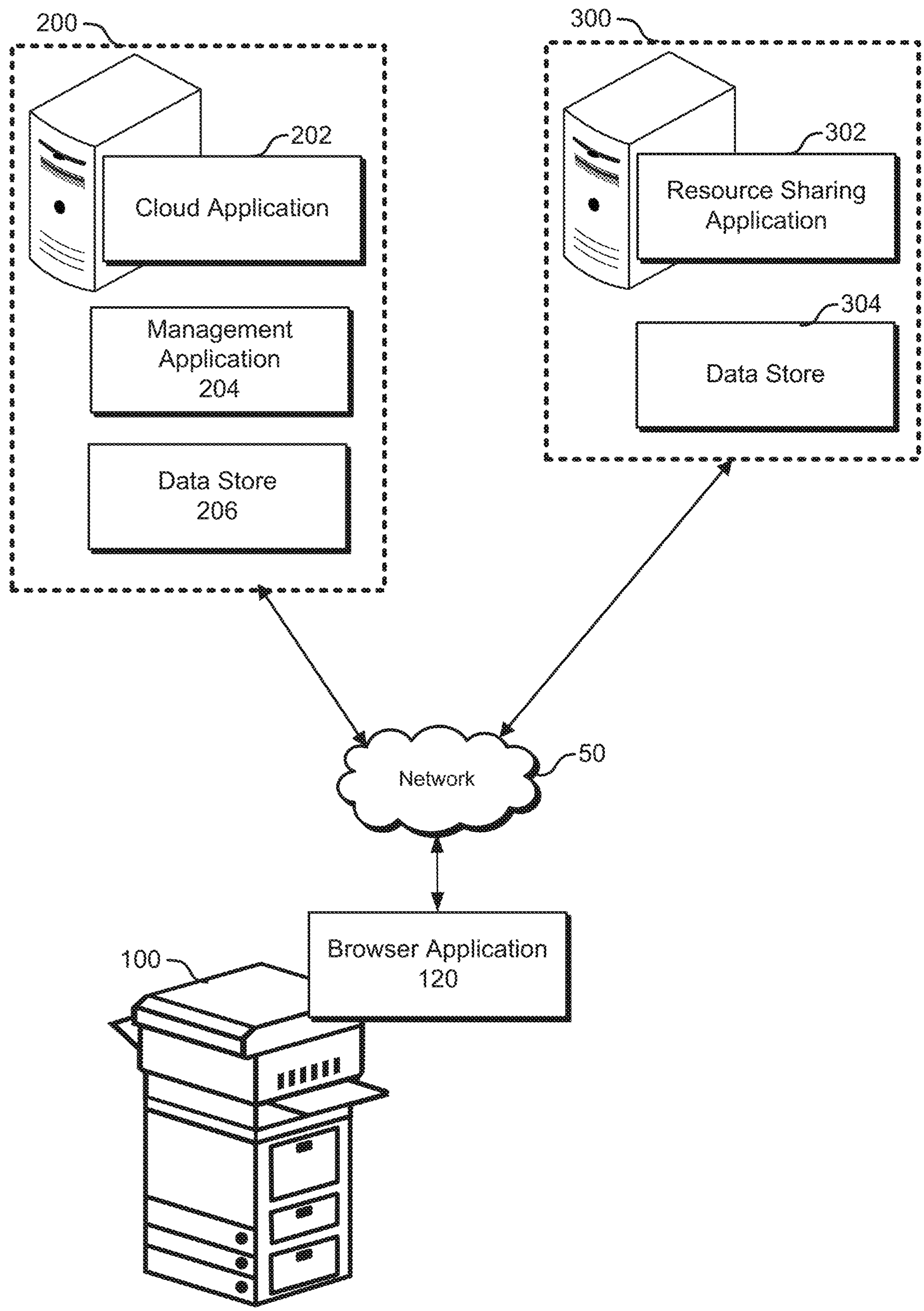
FIG. 1 illustrates an exemplary network environment according to invention principles.

Embodiments of the present invention are described with reference to the drawings. FIG. 1 illustrates an example network environment 10. The networked environment 10 depicts an image processing device 100, a first server 200 and a second server 300 each of which are connected to enable bidirectional communication therebetween via communications network 50. This networked environment including the components are shown herein are described for purpose of example only and to illustrate the principles of invention operation. It should be understood that any of the components shown herein may include one or more than one of the respective component. For example, a single image processing device 100 is shown and will be described. However, it should be understood that the present invention presumes a plurality of image processing devices interconnected with the first server 200 and/or second server 300 may be used. In this embodiment, the network 50 may be any type of communications network that enables bidirectional data communication between one or more devices connected to the network. In one embodiment, network 50 may be the Internet and enable packetized communication of data and messages between the one or more devices on the network. Additionally, the network 50 may also be embodied as a wired network, wireless network or a combination thereof. The network may also incorporate portions of telecommunications networks such as cellular, satellite or other types of communication networks.

In one embodiment, the image processing device 100 includes one or more applications executing thereon which control all operations of the image processing device including but not limited to control operations, operating systems, print functionality, scan functionality, communication functionality and the like. The image processing device 100 further includes a browser application 120. In one embodiment, the browser application 120 may enable a user to display and interact with text, images, form elements, or other information typically located on a web page served by a web server on the World Wide Web or a local area network such as one hosted on one of the first server 200 or second server 300. The browser may support various types of downloadable, executable, software modules, such as applets or plug-ins. For example, the browser may incorporate a virtual machine configured to execute a program, such as a JAVA applet, embedded in a web page accessed by the browser. The image processing device 100 may have various add-ons, plug-ins, or other extensions for use in or with the browser. In certain other embodiments, the browser may enable the user of the image processing device 100 to communicate with the first or second servers to select, obtain, request, process, display and/or other make use of data stored on the first and second servers. In other embodiments, the browser application 120 may enable the user to acquire data from the first server 200 and/or second server 300 and provide that data to another operational unit of the image processing device such as the printing unit to enable output by the printer of the image processing device of the data acquired from the servers 200/300. In some embodiments, the browser 120 may display a collection of text and image elements that are accessible by a user and which enable the user to perform any of the functionality set forth throughout this description.

The first server 200, the hardware components of which will be discussed hereinafter with respect to FIG. 3, includes a plurality of applications stored in memory and executed by one or more processors, controllers or processing units thereof. The first server includes a cloud application 202 (operations of which are discussed above) that executes functionality that enables control and communication between the first server 200 and any other device connected thereto such as the second server 300 and/or the image processing device 100. The cloud application 202 presents a digital platform that is output to and accessible by other systems or devices via the network 50. The cloud application 202 may employ rights-based control to allow access thereto allowing users to provide credentials which are validated thereby granting access to the one or more functions provided by the cloud application 202. The second server 200 may also include a management application 204 that selectively manages communication requests from one device on the network 50 to selectively locate and acquire a resource that is included in the request from one or more other devices on network 50. In one embodiment, the image processing device 100 may selectively issue a request for a resource via user interaction with the browser application 120. The management application 204 receives and parses the request to identify the resource being requested. Once the resource is identified, the management application 204 determines a location for the requested resource, for example, via a network address. In this example, the location identified by the initial request may point the management application 204 to access the third server 300 as will be discussed hereinafter. Once the location is identified, the management application 204 may issue a request to acquire the resource from the third server 300. In one embodiment, the resource may be a data file in a particular file format that can be output by a printer on the image processing device. In another embodiment, the resource may be access to an application executing on the third server. In a further embodiment, the resource may be an audio or audio-visual data file stored on the third server 300. Further description of the interaction between the management application 205 and the third server will be described below.

It should be noted that the management application 204 is described as a standalone application for the purpose of example only and to facilitate ease of understanding. It should be understood that the management application 204 may be included in the functionality of the cloud application 202 as a sub-routine or the like.

The second server 200 also may include a data store 206 that is embodied as a storage device which can store different types of data in a defined manner. In some embodiments, information stored in the data store 206 may be grouped and organized hierarchically. Data entries may represent entities, attributes, values or other suitable information. The information in the data store 206 may be grouped in any suitable manner and may be grouped for any suitable reason, such as for implementing task-specific functionality of an application which accesses the stored information. The data store 206 may include all or a portion of one or more data objects to which a file may be attached. Additionally, for a data object to which a file is attached, the data store 206 may include information associated with the attached file. For example, the data store 206 may include information that identifies the attached file and/or information for locating the attached file. The information associated with the attached file may include one or more of the following: a uniform resource locator (URL) of the file, a file name, a file path, or other suitable information. Other information associated with a data object may include session information indicating a communication session between the second server 200 and one or more devices connected thereto by network 50.

In some embodiments, cloud application 202 and/or management application 204 provides functionality for maintaining and accessing information stored in the data store 206. This may include performing various operations with respect to the data store 206. Examples of operations include adding entries to the data store 206; appending information to data stored in the data store 206; deleting entries from the data store 206; modifying entries in the data store 206; searching for entries in the data store 206; and retrieving entries from the data store 206.

A third server 300 is also shown in FIG. 1. The third server 300 may be a server that executes a resource sharing application 302 that provides access to one or more resources stored thereon. The resource sharing application 302 may provide the functionality of granting access to one or more users who can access one or more types of resources stored in a data store 304. The data store 304 may be of the similar type and provide similar functionality of the data store 206, the description of which is incorporated herein in its entirety.

In one embodiment, the resource sharing application 304 may be a file sharing cloud storage application such DROPBOX, BOX, GOOGLE DOCS. Thus, the resource sharing application may provide a platform that enables users to have private dedicated storage for data files and other information in data store 304 which may be selectively accessible via the network by different types of devices such as computers, servers, smartphones, tablets and like. In other embodiments, an image processing device 100 may also directly access the resource sharing application 304 to request and acquire information stored in the data store 304 of the third server.

In exemplary operation, the management application 204 executing on the second server 200 functions as an intermediary application the manages requests and provisions resources between the image processing device 100 and one or more resources of the third server 300. From the browser 120 of the image processing device 100, a user may select one or more resource from the third server 300 which is to be used by a particular function of the image processing device 100. In one embodiment, the browser 120 may display a webpage generated directly by the resource sharing application 300 which selectively displays the one or more resources in data store 304 that are available to the user at a given time. In another embodiment, the browser 120 may display a webpage generated by the management application 204 which displays, to the user, one or more resources of the third server 300 which are available to the user. In this embodiment, the management application 204 may acquire the information identifying available resources of the third server based on predetermined configuration information provided by a user. For example, when the third server 300 is providing the service of a cloud-based file sharing service (e.g. GOOGLE DOCS), the management application 204 may store user-specific service information that instructs the management application 204 of different servers or systems that host different resources to which a particular user may have access. Thus, a configuration file associated with each user of the cloud application 202 may be stored in data store 206 and include information identifying different types of services offering resources to which the user may have access. This information may include address information identifying a location on a communications network for the service as well as credential information associated with a user to enable access to the service on the third server. Credential information may be the same credential information used to access the cloud application 202 or different credential information.

A problem may arise when a user selects, from the browser 120, a data file stored in data store 304 made accessible by resource sharing application 302 and the selected file has a file size greater than a predetermined threshold. Because the image processing device 100 has a limited memory size, it may not be possible for the image processing device 100 to directly receive and process the selected file in the memory of the image processing device for the purpose that the file was requested. If the requested file size exceeds a predetermined memory size, the image processing device 100 cannot load the file and perform an operation based on the data file. For example, if the file is a certain size, the image processing device cannot load the file in the portion of the memory accessible to the browser to allow for the data file to be output by the printing unit of the image processing device 100. This problem is exacerbated when a user selects a print preview function and then determines that the data file should be printed. The result would require multiple downloads of the same file and exceed the memory capacity of the image processing device 100.

Figure 2:
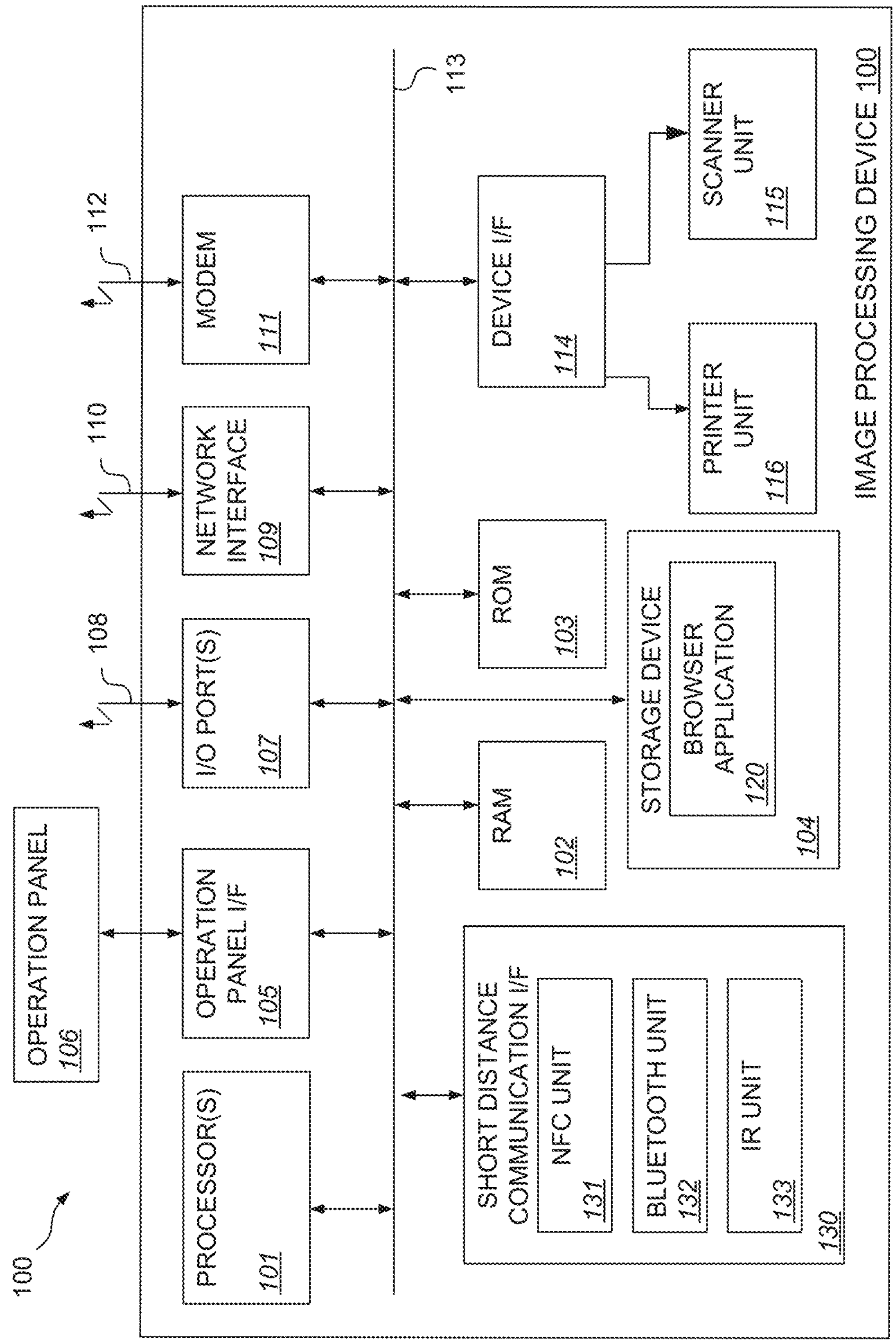
FIG. 2 is a block diagram depicting the components of an image processing device according to invention principles.

The image processing device 100 illustrated in FIG. 2 may be a multifunction peripheral having a scanning function in addition to printing, copying and other functions. However, it will be understood that various other implementations of an image processing device are within the scope of the present invention. For example, various components, modules, functions, and/or configurations of the image processing device 100 of FIG. 1 could be combined, deleted, or modified to form further implementations. Further by way of example, in some embodiments, other devices (for example, other devices having scanning capabilities) and/or servers (for example, a computer connected to a scanner) may be implemented as the image processing device 100. Every time the user requests the file, the whole document needs to be downloaded by the second server 200 and further transmitted to the browser 120 of the image processing device. In a situation where a file is previewed and a user then decides to print the file, the second server 200 needs to download the same file from third server 300 a second time. The management application 204 resolves this problem by caching the requested file on the second server 200 in a way to reduce the traffic load. Instead of deleting the file when one request is completed, the management application 204 will store the file retrieved from the third server 300 in the data store 206 of the second server enabling repeated access to the same file if a further request associated with the stored file is received by the management application 204. In this way, the management application 204 advantageously reduces the traffic load between the second server 200 and the third server 300 by eliminating the need for communications therebetween simply to download the same file multiple times. The management application 204 further advantageously obtains the data file stored in the data store 304 of the third server 300 and stores a first version of the requested data file which is used for a first type of processing performed by the image processing device 100 and a second different version of the requested file used for a second type of processing performed by the image processing device. In one embodiment, the first version of the data file caused to be stored by management application 204 is a full version of the data file and the first type of processing performed by the image processing device 100 on the first version is print processing. Further, the second version of the data file caused to be stored by management application 204 is a thumbnail version of the data file which represents a reduced file size and used for display to a user on the operation panel of the image processing device (or on a device coupled to the image processing device such as a smart phone or tablet) to display to a user a sample (e.g. a selected portion of the data derived from the full size file) of the data file for use in determining if the requested file is the desired file. The second thumbnail version may be used for the second processing which is preview processing where the file is visually displayed for inspection by the user as discussed above.

The management application 204 associates the stored versions of the data file with information identifying the session connection between the image processing device 100 and the cloud application 202 of the second server 200. In doing so, only one document and one thumbnail are stored for each session and will be deleted in response to certain deletion conditions. Deletion conditions include (1) Session is timed out; (2) Another file is requested; (3) the first processing (e.g. Printing) is completed; and/or (4) the stored file is outdated.

In another embodiment, the management application 204 may manage and store requests for multiple files during a particular connection session between the image processing device 100 and the second server 200. In a first instance of multiple file management, the management application 204 of the second server 200 includes session configuration information identifying a maximum allowance for each session. The maximum allowance value identifies a maximum number of files per session and a maximum size per file. The maximum allowance values may be dynamically determined by calculating the value based on the maximum number of simultaneous requests that the second server 200 allows and a size of data store 206 of the second server. Alternatively, the maximum allowance value may be predetermined by an administrator of the second server 200 to meet predetermined operational criteria. The management application 204, at the same time, tracks the used memory size of each session. Before downloading the file from the resource sharing application 302 on the third server 300, the management application 204 of the second server 200 checks if an amount of available memory for the particular session and a file size for the data file being requested is greater than the maximum allowance value and deletes any previously requested and stored data files and obtains the newly requested data file from the third server 300. This embodiment will be further described below with respect to FIG. 8.

Another manner in which the management application 204 may manage the multiple files includes tracking the total size of the used memory and the size of available memory. Each session can use any amount of available memory up to the maximum size of available memory. The management application 204 further tracks a list of files that paired with the session identifier (session id) and when the available memory is less than the size of downloading file, the server deletes file from the beginning of the list until the available memory is large than the size of downloading file and then downloads the new file. This will be further described hereinafter with respect to FIG. 9.

FIG. 2 illustrates the hardware components of the image processing device 100 shown and discussed in FIG. 1. The image processing device 100 includes one or more processor(s) 101. The processor(s) 101 include a central processing unit (CPU) that performs overall control functions for the image processing device 100. The CPU uses a random access memory (RAM) 102 as a work area while executing instructions. The CPU executes instructions of various programs stored in one or more memory devices 104. For example, the CPU executes programs stored in a read only memory (ROM) 103 and in a storage device 104.

In some embodiments, the processor(s) 101 include one or more processors in addition to the CPU. By way of example, the processor(s) 101 may include one or more general-purpose microprocessor(s), application-specific microprocessor(s), and/or special purpose microprocessor(s). Additionally, in some embodiments the processor(s) 101 may include one or more internal caches for data or instructions.

The processor(s) 101 provide the processing capability required to execute an operating system, application programs, and various other functions provided on the image processing device 100. The processor(s) 101 perform or cause components of the image processing device 100 to perform various operations and processes described herein, in accordance with instructions stored in one or more memory devices 104.

The RAM 102 is used as a work area when the processor(s) 101 execute various instructions, such as those making up computer programs stored in the ROM 103 and/or the storage device 104. The RAM 102 may be used as a temporary storage area for various data, including input image data and data created by an application executing on the image processing device 100 or data received from one or more mobile computing devices 200 which is then further processed by one or more applications executing on the image processing device 100. The RAM 102 may be used as a cache memory. In some embodiments, the RAM may be dynamic RAM (DRAM) or static RAM (SRAM).

The ROM 103 stores data and programs having computer-executable instructions for execution by the processor(s) 101. In some embodiments, the ROM 103 is a boot ROM, storing instructions for the booting process. In some embodiments, the ROM 1203 may be flash memory. In certain instances, the ROM 103 may include an operating system for controlling the operation of the image processing device 100. In this case, an operating system application stored in ROM 103 (or alternatively stored in the storage device 104 and accessible once the boot routine of the image processing device 100 is completed), contains a catalog of other applications executing on the image processing device and provide information about such other executing applications to one another enabling interoperation there between.

An operation panel interface 105 provides output signals to and receives input signals from an operation panel 106. Regarding the output signals, the operation panel interface 105 provides GUI data to the operation panel 106 for display on a display device such as liquid crystal display (LCD) or an light emitting diode display (LED). Regarding the input signals, the operation panel interface 105 receives input signals based on user input operations at the operation panel 106 and relays the input signals to the processor(s) 1201. In some embodiments, the operation panel 106 includes a touch sensitive element operable to receive user input operations or commands based on the touching of graphical objects displayed on the display. In some embodiments, the operation panel 106 includes a hard key panel.

The image processing device 100 includes one or more input/output (I/O) port(s) 1207. The I/O port(s) 107 may include any suitable interface type such as a universal serial bus (USB) port, FireWire port (IEEE-1394), serial port, parallel port, or AC/DC power connection port. The I/O port(s) 107 enable one or more external device(s) 108 to communicate with the image processing device 100 when the external device(s) 108 is/are connected to the I/O port(s) 107.

A network interface 109 includes hardware, software, or both providing one or more interfaces for communication (such as, for example, packet-based communication) between the image processing device 100 and one or more other servers or one or more networks 110. As an example and not by way of limitation, the network interface 109 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network 110 and any suitable network interface 109 for it. As an example and not by way of limitation, the image processing device 100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks 110 may be wired or wireless. As an example, the image processing device 100 may communicate with a wireless PAN (WPAN) (such as, for example, a BLUETOOTH WPAN), a WI-FI network, a WI-MAX network, or other suitable wireless network or a combination of two or more of these. The image processing device 100 may include any suitable network interface 109 for any of these networks 110, where appropriate.

A system bus 113 interconnects various components of the image processing device 100 thereby enabling the transmission of data and execution of various processes. The system bus 113 may include one or more types of bus structures including a memory bus or memory controller, a peripheral bus, and a local bus using any of a variety of bus architectures.

The device interface 114 is connected to the scanner unit 115 and to the printer unit 116. The device interface 114 performs synchronous/asynchronous conversion of image data.

The scanner unit 115 includes a light source and an image sensor. The scanner unit 115 may include a glass platen and/or an automatic document feeder (ADF). In operation, the light source illuminates a physical document positioned on the glass platen or fed by the ADF. Light reflected by the physical document reaches the image sensor, and the image sensor converts the light into electrical signals. In some embodiments, the scanner unit 115 includes an optical system (for example, mirrors, lens) that directs the light to the image sensor. After the image sensor generates the electrical signals, an analog-to-digital converter converts the electrical signals to digital image data representing the scanned physical document. The scanner unit 115 then outputs the digital image data to one or more other components of the image processing device 100 via the device interface 114.

The printer unit 116 is an image output device for printing on a sheet an image corresponding to image data. In response to a print command received at the image processing device 100, the printer unit 116 receives image data via the device interface 114 and outputs to a sheet an image corresponding to the image data.

Image processing device 100 may also include a short distance communication interface (I/F) 130. The short distance communication interface 130 facilitates communication between one or more applications executing on the image processing device 100 and at least one mobile computing device 200 using one or more short distance communication protocols. Thus, the short distance communication interface 130 includes a near field communication unit 131 (for example, an NFC reader) enabling bidirectional communication with a mobile computing device having NFC functionality. The NFC unit 131 includes circuitry and software that enables transmission (writes) and reception (reads) of commands and data with a non-contact type device using a short distance wireless communication technique such as NFC (Near Field Communication; ISO/IEC IS 18092). In other embodiments, the short distance communication interface 130 may also include a BLUETOOTH communication unit 132 that includes a transceiver capable of transmitting and receiving data via short wavelength radio waves ranging in frequency between 2.4 GHz and 2.485 GHz. In other instances, the short distance communication interface 130 may also include an infrared (IR) unit that can emit and sense electromagnetic wavelengths of a predetermined frequency have data encoded therein. Furthermore, while not specifically shown, the short distance communication interface may also include a smart card reader, radio-frequency identification (RFID) reader, device for detecting biometric information, a keyboard, keypad, sensor(s), a combination of two or more of these, or other suitable devices.

The depiction of the short distance communication interface 130 is done merely to facilitate the understanding of the operation of the present arrangement and it should be understood that the short distance communication interface 130 may also be embodied as part of the I/O ports 107 and/or the network interface 109. Alternatively, an image processing device 100 for use in accordance with invention principles need not contain any short distance communication circuitry.

A storage device 104 stores application data, program modules and other information. One or more program modules stored in the storage device 104 are configured to cause various operations and processes described herein to be executed. The storage device 104 also stores other programs and data to be processed. For example, the storage device 104 stores an operating system including programs and data for managing hardware and software components of the image processing device 100. Applications on the image processing device 100 may utilize the operating system to perform various operations. The storage device 104 may further store other programs and/or drivers that enable various functions of the image processing device 100, graphical user interface (GUI) functions, and/or processor functions. The storage device 104 may also store data files including, for example, image data, user data, configuration information, GUI components, such as graphical elements or templates, or other data required by the image processing device 100.

In some embodiments, the image processing device 100 includes one more applications including one or more programs for controlling access to one or more resources on the image processing device 100. In some embodiments, applications stored in the storage device 104 includes one or more programs for controlling access to one or more applications (or particular functionality thereof) executing on the image processing device 100.

In some embodiments, access to one or more resources of the application is controlled based on a credential associated with the entity attempting to access the one or more resources of the application. Policies for controlling access to various resources of the application may be stored at the image processing device 100. In other embodiments, access control policies may reside in a centralized or enterprise server remotely located from the image processing device 100. Once access to an application is granted, a user gains access to one or more resources of the application, including task-specific functionality of the application. The task-specific functionality of the application may enable the user to perform one or more tasks using the application. For example, the application 100 may provide various functions, features and user interfaces for processing image data, transmitting data over a network, managing one or more databases, or other tasks. In some embodiments, the application 100 is configured to use one or more resources of the image processing device 100 to perform a process in response to an instruction from the user.

An application executing on image processing device 100 may use functionality of and/or information on the image processing device 100 to employ hardware, software, or both for that provides scanning functionality. For example, the image processing device 100 may include an image sensor or a camera for capturing an image.

In certain embodiments, the application executing on the image processing device 100 provides communication functionality for transmitting image file (or other electronic document data file format) via the network 50 to any other computing system and/or server 200/300 connected thereto. The communication functionality of the application may be implemented by interaction with the network interface 109 which converts data into a transmissible data form able to be communicated over a network 50 to server 200/300 (or other computing system). In addition to, or instead of using the network interface 109, application functionality that requires transmission of data may be performed using the short distance communication interface 130 (including any and all types of short distance communication described herein). The application may also enable the image processing device 100 to receive instruction data from other systems on the network 50 enabling access to and control of any functionality provided by application. The receipt of data from the server 200/300 or other computing device may similarly occur using any of the network interface 109, short distance communication interface 130 or the like. The communication functionality of application may also enable the image processing device 101 to receive and process data objects generated by any system connected to the image processing device 101 via the network 50.

In some embodiments, the application executing on the image processing device 100 provides functionality for maintaining and accessing information in a data structure, which may be any suitable data structure for organizing data. For example, information associated with a user or process may be added as one or more entries into a data structure. The application executing on the image processing device 100 may store and/or retrieve data in a memory or on a hard disk of the image processing device 100. In some embodiments, the image processing device 100, when executing the application, may perform various operations with respect to a data store. Examples of operations include adding entries to a data store; deleting entries from a data store; modifying entries in a data store; searching for entries in a data store; and retrieving entries from a data store. The data store management functionality provided by application discussed above is also applicable to data stores located on remote computing systems and/or servers connected to the image processing device 100 via the network 50.

The application executing on the image processing device 100 may provide functionality for generating information and providing the information to a user interface of the image processing device 100 displayed on operation panel 106. The information may include text, images, form elements, files, executable programs, or other suitable information. The information provided by the application may include content for display on a display of the image processing device 101.

In another embodiment, the storage device 104 stores a browser application 120. the browser application 120 may enable a user to display and interact with text, images, form elements, or other information typically located on a web page served by a web server on the World Wide Web or a local area network such as one hosted on one of the first server 200 or second server 300. The browser may support various types of downloadable, executable, software modules, such as applets or plug-ins. For example, the browser may incorporate a virtual machine configured to execute a program, such as a JAVA applet, embedded in a web page accessed by the browser. The image processing device 100 may have various add-ons, plug-ins, or other extensions for use in or with the browser. In certain other embodiments, the browser may enable the user of the image processing device 100 to communicate with the first or second servers to select, obtain, request, process, display and/or other make use of data stored on the first and second servers. In other embodiments, the browser application 120 may enable the user to acquire data from the first server 200 and/or second server 300 and provide that data to another operational unit of the image processing device such as the printing unit to enable output by the printer of the image processing device of the data acquired from the servers 200/300. In some embodiments, the browser 120 may display a collection of text and image elements that are accessible by a user and which enable the user to perform any of the functionality set forth throughout this description.

In some embodiments, the image processing device 100 may include other storage media. By way of example, and not by way of limitation, the storage media may include a floppy disk drive, flash memory, an optical disc, a magneto-optical disc, magnetic tape, or a Universal Serial Bus (USB) drive or a combination of two or more of these. Where appropriate, the storage media may include removable or fixed media. Where appropriate, the storage media may be internal or external to the image processing device 100. In some embodiments, the storage media is non-volatile, solid-state memory. The storage media may take any suitable physical form. For example, the storage media may be in the form of one or more removable blocks, modules, or chips. The computer-readable storage medium need not be one physical memory device, but can include one or more separate memory devices.

In another embodiment, the image processing device 100 may be accessed and operated using an external computing device. In some embodiments, the external; computing device may be a smartphone. In other embodiments, the external computing device may be a tablet computing device. Accessing the image processing device 100 via an external computing device may allow a user to have the GUI generated by the operation panel interface 105 output onto a screen of the external computing device. Connection between the image processing device 100 and any external computing device may occur via the network interface 109 and/or the short distance communications interface 130.

Figure 3:
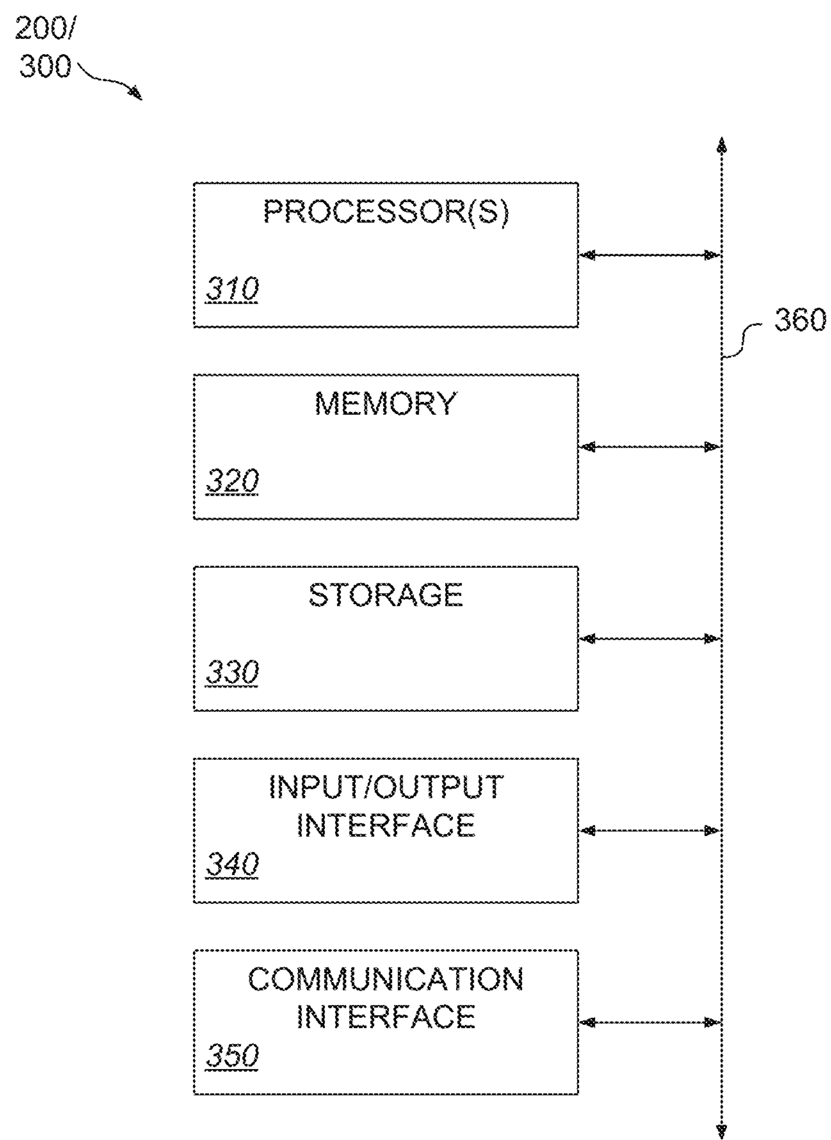
FIG. 3 is a block diagram depicting the components of a server computing system according to invention principles.

FIG. 3 illustrates the hardware components of an exemplary first server 200 and/or second server 300 (or any other computing system) with which the image processing device 100 may communicate. According to various embodiments, all or a portion of the description of the server is applicable to all or a portion of one or more of the first server 200 or the second server 300.

The term server (or computing system) as used herein includes but is not limited to one or more software modules, one or more hardware modules, one or more firmware modules, or combinations thereof, that work together to perform operations on electronic data. The physical layout of the modules may vary. A server may include multiple computing devices coupled via a network. A server may include a single computing device where internal modules (such as a memory and processor) work together to perform operations on electronic data. Also, the term resource as used herein includes but is not limited to an object that can be processed at a server. A resource can be a portion of executable instructions or data.

In some embodiments, the server 200/300 performs one or more steps of one or more methods described or illustrated herein. In some embodiments, the server 300 provides functionality described or illustrated herein. In some embodiments, software running on the server 200/300 performs one or more steps of one or more methods described or illustrated herein or provides functionality described or illustrated herein. Some embodiments include one or more portions of the server 200/300.

The server 200/300 includes one or more processor(s) 310, memory 320, storage 330, an input/output (I/O) interface 340, a communication interface 350, and a bus 360. The server 200/300 may take any suitable physical form. For example, and not by way of limitation, the server 200/300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, PDA, a server, a tablet computer system, or a combination of two or more of these.

The processor(s) 310 include hardware for executing instructions, such as those making up a computer program. The processor(s) 310 may retrieve the instructions from the memory 320, the storage 330, an internal register, or an internal cache. The processor(s) 310 then decode and execute the instructions. Then, the processor(s) 310 write one or more results to the memory 320, the storage 330, the internal register, or the internal cache. The processor(s) 310 may provide the processing capability to execute the operating system, programs, user and application interfaces, and any other functions of the server 200/300.

The processor(s) 310 may include a central processing unit (CPU), one or more general-purpose microprocessor(s), application-specific microprocessor(s), and/or special purpose microprocessor(s), or some combination of such processing components. The processor(s) 310 may include one or more graphics processors, video processors, audio processors and/or related chip sets.

In some embodiments, the memory 320 includes main memory for storing instructions for the processor(s) 310 to execute or data for the processor(s) 310 to operate on. By way of example, the server 200/300 may load instructions from the storage 330 or another source to the memory 320. During or after execution of the instructions, the processor(s) 310 may write one or more results (which may be intermediate or final results) to the memory 320. One or more memory buses (which may each include an address bus and a data bus) may couple the processor(s) 310 to the memory 320. One or more memory management units (MMUs) may reside between the processor(s) 310 and the memory 320 and facilitate accesses to the memory 320 requested by the processor(s) 310. The memory 320 may include one or more memories. The memory 320 may be random access memory (RAM).

The storage 330 stores data and/or instructions. As an example and not by way of limitation, the storage 330 may include a hard disk drive, a floppy disk drive, flash memory, an optical disc, a magneto-optical disc, magnetic tape, or a Universal Serial Bus (USB) drive or a combination of two or more of these. In some embodiments, the storage 330 is a removable medium. In some embodiments, the storage 330 is a fixed medium. In some embodiments, the storage 330 is internal to the server 200/300. In some embodiments, the storage 330 is external to the server 200/300. In some embodiments, the storage 330 is non-volatile, solid-state memory. In some embodiments, the storage 330 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. The storage 330 may include one or more memory devices. One or more program modules stored in the storage 330 may be configured to cause various operations and processes described herein to be executed.

The I/O interface 340 includes hardware, software, or both providing one or more interfaces for communication between the server 200/300 and one or more I/O devices. The server 200/300 may include one or more of these I/O devices, where appropriate. One or more of these I/O devices may enable communication between a person and the server 200/300. As an example and not by way of limitation, an I/O device may include a keyboard, keypad, microphone, monitor, mouse, speaker, still camera, stylus, tablet, touch screen, trackball, video camera, another suitable I/O device or a combination of two or more of these. An I/O device may include one or more sensors. In some embodiments, the I/O interface 340 includes one or more device or software drivers enabling the processor(s) 310 to drive one or more of these I/O devices. The I/O interface 340 may include one or more I/O interfaces.

The communication interface 350 includes hardware, software, or both providing one or more interfaces for communication (such as, for example, packet-based communication) between the server 200/300 and one or more other servers or one or more networks. As an example and not by way of limitation, the communication interface 350 may include a network interface card (NIC) or a network controller for communicating with an Ethernet or other wire-based network or a wireless NIC (WNIC) or wireless adapter for communicating with a wireless network, such as a WI-FI network. This disclosure contemplates any suitable network and any suitable communication interface 350 for it. As an example and not by way of limitation, the server 200/300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the server 200/300 may communicate with a wireless PAN (WPAN) (such as, for example, a Bluetooth WPAN or an ultra wideband (UWB) network), a WI-FI network, a WI-MAX network, a cellular telephone network (such as, for example, a Global System for Mobile Communications (GSM) network), or other suitable wireless network or a combination of two or more of these. Additionally the communication interface may provide the functionality associated with short distance communication protocols such as NFC and thus may include an NFC identifier tag and/or an NFC reader able to read an NFC identifier tag positioned with a predetermined distance of the computing device. The server 200/300 may include any suitable communication interface 350 for any of these networks, where appropriate. The communication interface 350 may include one or more communication interfaces 350.

The bus 360 interconnects various components of the server 200/300 thereby enabling the transmission of data and execution of various processes. The bus 360 may include one or more types of bus structures including a memory bus or memory controller, a peripheral bus, and a local bus using any of a variety of bus architectures.

Figure 4:
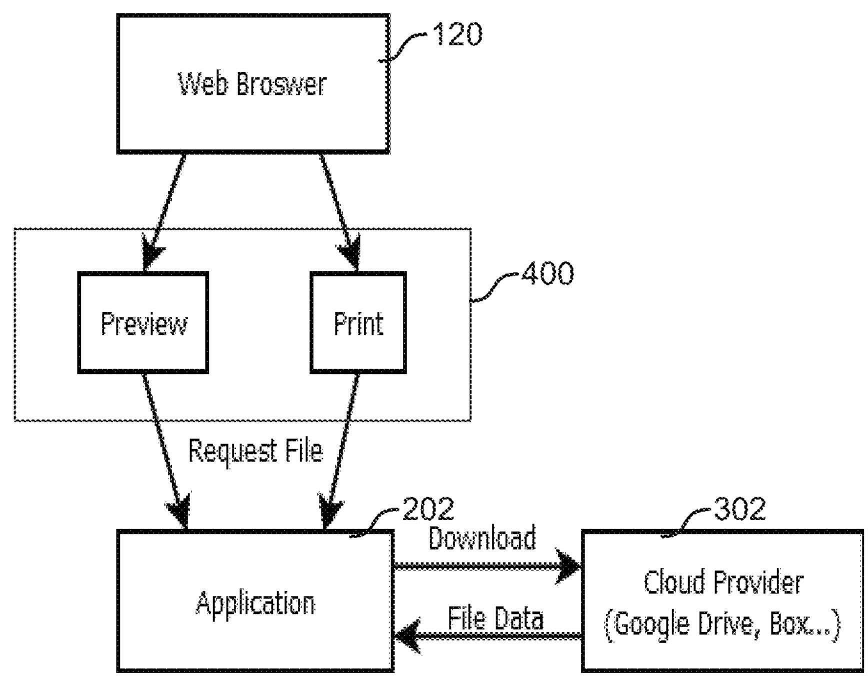
FIG. 4 illustrates exemplary operation of the management application according to invention principles.

FIG. 4 is a flow diagram detailing the operation of file request and provisioning between the image processing device 100, first server 200 and second server 300 as in the prior art and illustrates the problem associated therewith. The embodiment herein illustrates that the first server 200 is an intermediary cloud server that is positioned between the image processing device 100 and the third server 300. In this exemplary operation, the image processing device, via the browser, makes a request 402 for a data stored at the third server 300 to perform a first or second type of processing thereon. The request 400 is issued by the browser 120 of the image processing device and received by the cloud application 202. The cloud application 202 forwards the request to download the file stored on the third server and managed by the resource sharing application 302. The forwarded request is processed by the resource sharing application 302 and the requested data file is provided back to the cloud application 202 which further provides the data file to the image processing device 100 for processing. In the instance where there are two possible types of processing, a first type of processing (e.g. print processing) and a second type of processing (e.g. preview processing) each time the browser issues a respective type of request, the cloud application has to repeat the forwarding of the request to the third server and re-acquire the requested file. This occurs because, the memory of the image processing device is not of a sufficient size to maintain the acquired file therein so, for each type of processing request, the file must be newly acquired. The result of this type of operation is degraded performance of the second server 200 because of the multiple requests which need to be received and forwarded as well as the traffic load required to download the same file multiple times.

Figure 5:
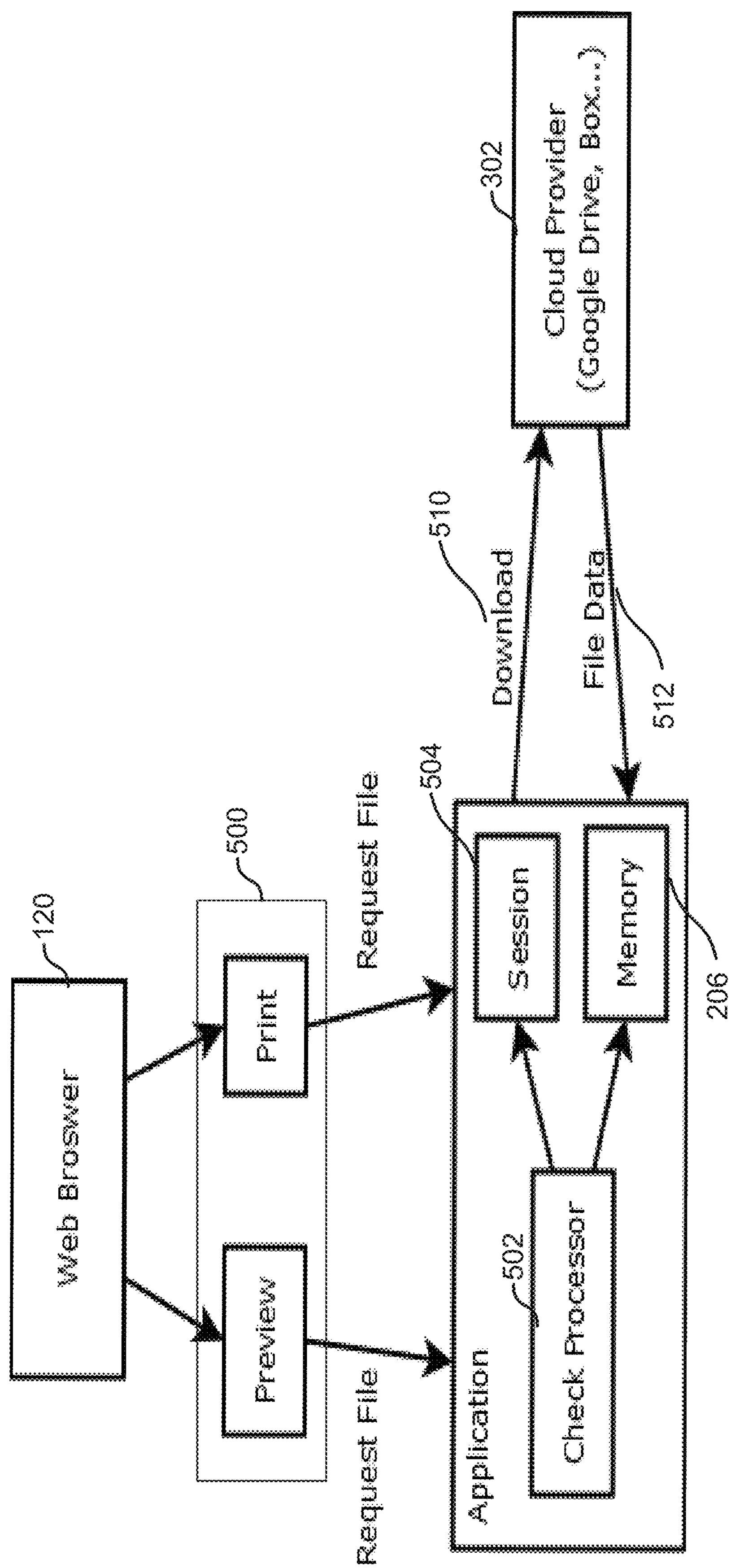
FIG. 5 illustrates exemplary operation of the management application according to invention principles.

FIG. 5 is an illustration of the operational flow of the management application 204 according to invention principles which remedies the deficiencies described above with respect to FIG. 4. As shown herein, the browser 120 issues a request 500 to acquire a particular data file to perform a first type of processing (e.g. print processing) or a second type of processing (e.g. preview processing) thereon. The request 500 is received by management application 204 which identifies session information 504 associated with the request 500 and stores session information 504 into memory 206. The management application 204 issues a further request 510 to the resource sharing application 302 hosted on the third server 300 for the file identified in the initial request 500 issued by the browser 105. The further request 510 may include logon information associated with a user that is requesting the file in order to access the file via the resource sharing application 302. The resource sharing application 302 will parse the request to identify the file requested and perform processing on the data store to locate and retrieve the requested file. The requested file will be further processed into a format suitable for network transmission via communications network 50 and downloaded from the resource sharing application 302 by the management application 204 as file data 520. The management application 204 will associate the downloaded file data 520 with the session information 504 and store both in memory 206. In this instance, should the request 500 be one for preview processing, a modified version of the data file will be generated and transmitted to the browser 105 for review by the user. Should this be the correct file desired to be output and undergo print processing, the user would issue a subsequent request for print processing. Here, the check processor 502 would receive the request and query both the session information 504 and memory 206 for the requested data file to determine if the requested data file had been previously acquired. Because the data file will only be deleted under certain deletion conditions, the check processor 502 advantageously retrieves the data file from memory and provides the retrieved file to the browser 120 so that the data file can be output by the print unit of the image processing device. This advantageously minimizes server load operations because the second server need not resubmit a request for and re-download the file a second time. Further, the management application improves the operation by speeding up the time between determining that a selected file is desired to be output and actually retrieving the data for output because the file is already stored in the memory of the second server 200.

Figure 6:
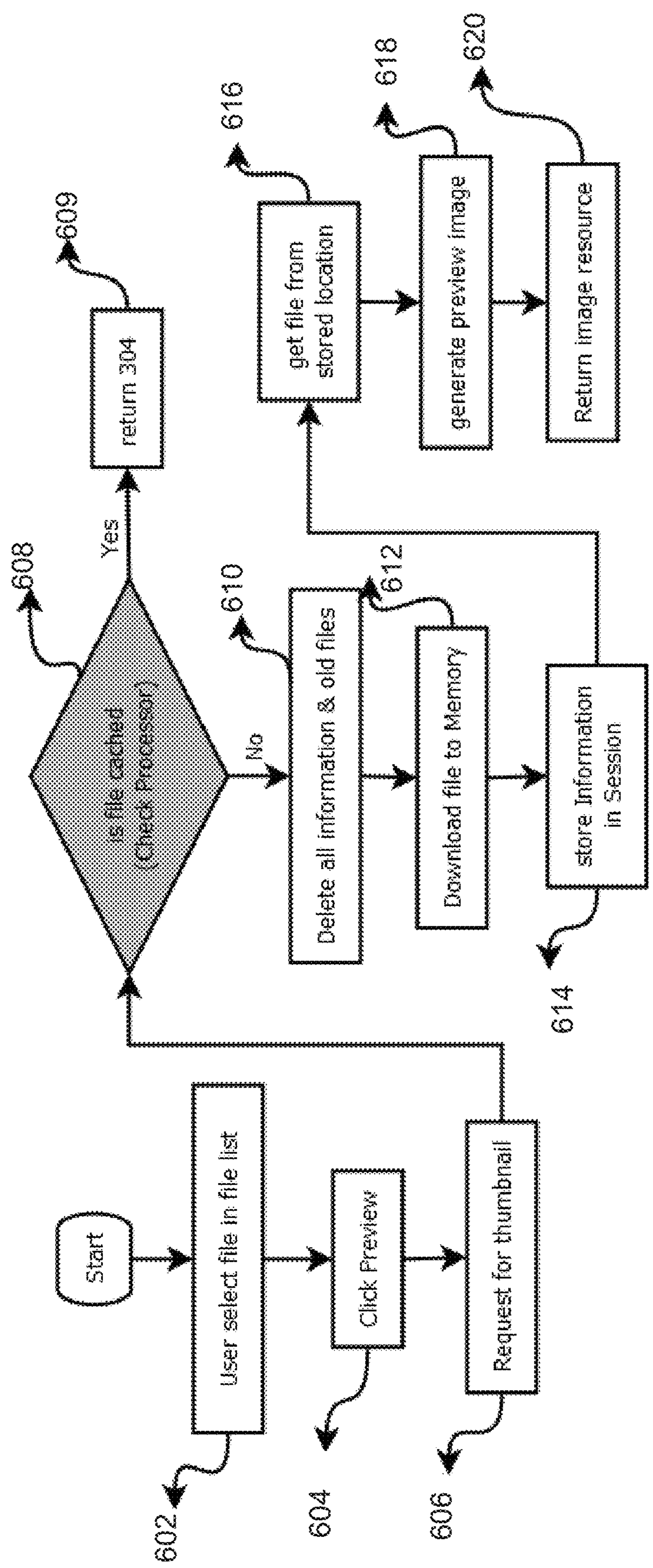
FIG. 6 is a flow diagram detailing exemplary operation according to invention principles.

FIG. 6 is a flow diagram detailing the operation of the system according to invention principles. In step 602, a user selects a file from a set of candidate files generated by the management application 204 and displayed within the browser 105 on the image processing device 100. In step 604, a user selects a type of processing to be applied to the selected filed. In one embodiment, the type of processing selected is a preview processing operation. In step 606, a request for a version of the data file suitable for use in preview processing is generated and communicated from the browser 105 to the management application 204 of the second server. In step 608, the check processor 502 of the management application 204 determines whether the requested file is cached in memory 206 of the second server. If the result of the query in step 608 is positive, the management application 204 generates an HTTP status message code 304 indicating that the requested document was not modified and provides this message to the browser 105 on the image processing device. If the result of the query in step 608 is negative, the management application 204 deletes any previously stored information and data files that predate this current request in step 610. In step 612, the management application 204 acquires the requested file from the third server 300. In step 614, the acquired requested file is stored in memory and associated with session information corresponding to the communication session between the image processing device 100 and the management application 204 of the second server 200. The management application 204, in step 616, retrieves the stored data file from memory location and generates a preview image in step 618 which is then returned to the browser in step 320.

Now that the file has been acquired and stored, when a user wishes to print the file, a print request can be generated and when the above flow reaches step 608, the management application can acquire the complete data file to be printed and transmit the file to the image processing device without having to reacquire the file from the third server.

Figure 7:
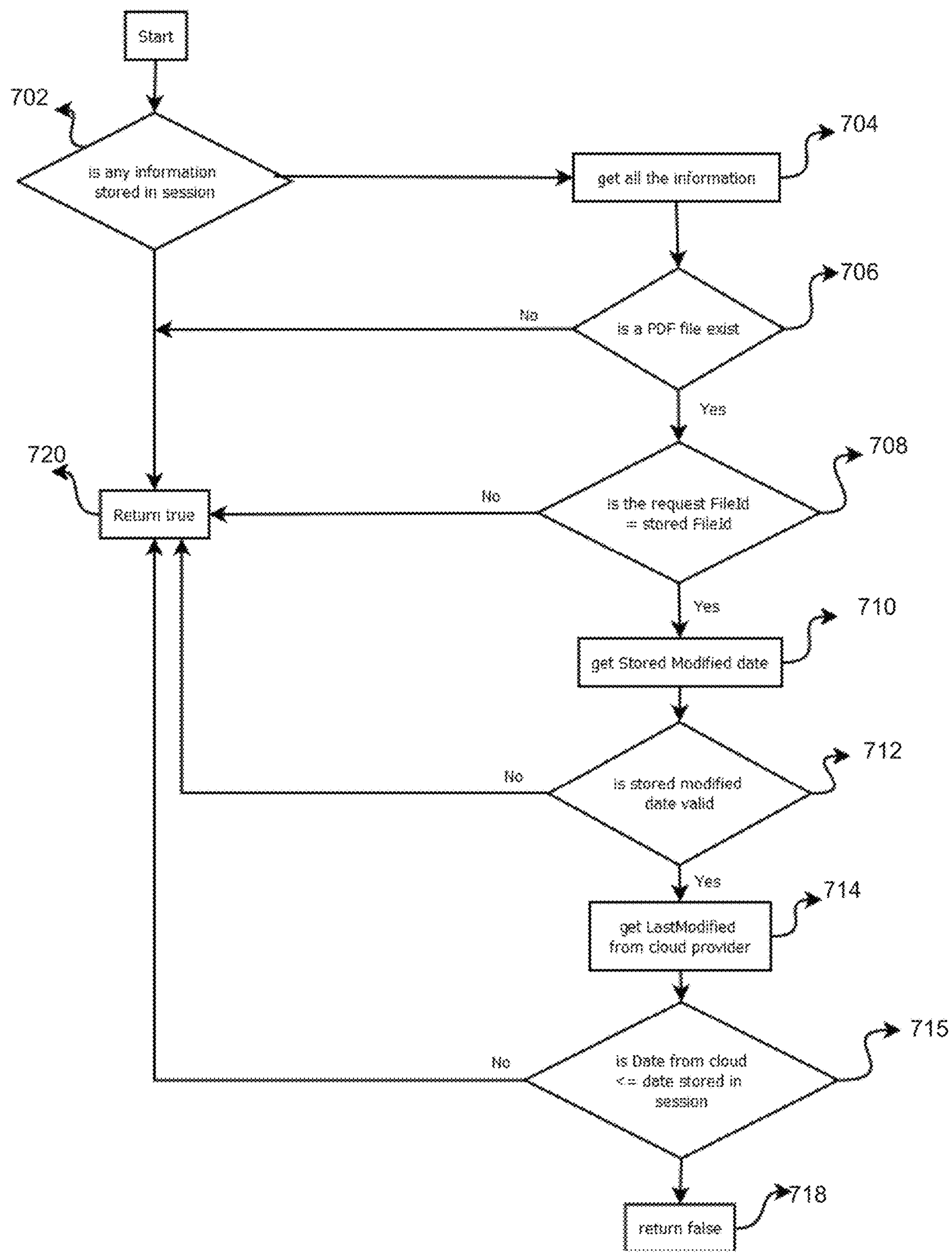
FIG. 7 is a flow diagram detailing exemplary operation according to invention principles.

FIG. 7 is a flow diagram illustrating the operations performed in step 608 in FIG. 6 by the check processor 502 of the management application 204. In step 702, the management application checks if the session contains any information stored in the current communication setting associated with the requested file. If the result of the query in step 702 is negative, an indication that no file is cached is returned in step 720. If the result of the query in step 702 is positive, the requested information is retrieved in step 704. This information includes File ID, stored File path, the name of file, stored thumbnail path, and last modified date. In step 706, a determination is made whether a predetermined type data file is present. In one embodiment, the predetermined type of file is a PDF file. This is described for purposes of example only and the management application may determine if files of any file data format are present in memory of the second server and associated with the session. If the result of the query is negative, the management application proceeds to step 720. If the result of the query in step 706 is positive, the management application determines that the file exists and checks, in step 708, if the requested file ID is the same as the stored file ID. If the result of the query in step 708 is negative indicating that the ID is not the same, the flow proceeds to step 720. If the result of the query in step 708 is positive, the management application 204 acquires stored last modified date of the information from the session in step 710. In step 712, the management application 204 checks if the stored modified date is valid. If the result of the determination in step 712 is negative, the flow proceeds to step 720 indicating that the file is not cached. If the determination in step 712 is positive indicating that the data is valid, the management application retrieves information identifying the last modified date of the selected file from the resource sharing application 302 of the third server in step 714. A comparison is made in step 716 comparing the stored last modified date acquired in step 710 with the last modified date acquired in step 714. If the stored last modified date of step 710 is earlier than the date acquired in step 714, the flow proceeds to step 720 indicating that the requested file is not cached. If the stored last modified date of step 710 is the same or later than the date acquired in step 714, the management application 204 determines that the file is cached and can be used to fulfill the request made by the browser 105.

In another embodiment the management application may provide certain ways to manage requests for multiples data files from the third server 200. The management application 204 may manage and store requests for multiple files during a particular connection session between the image processing device 100 and the second server 200. In a first instance of multiple file management, the management application 204 of the second server 200 includes session configuration information identifying a maximum allowance for each session. The maximum allowance value identifies a maximum number of files per session and a maximum size per file. The maximum allowance values may be dynamically determined by calculating the value based on the maximum number of simultaneous requests that the second server 200 allows and a size of data store 206 of the second server. Alternatively, the maximum allowance value may be predetermined by an administrator of the second server 200 to meet predetermined operational criteria. The management application 204, at the same time, tracks the used memory size of each session. Before downloading the file from the resource sharing application 302 on the third server 300, the management application 204 of the second server 200 checks if an amount of available memory for the particular session and a file size for the data file being requested is greater than the maximum allowance value and deletes any previously requested and stored data files and obtains the newly requested data file from the third server 300.

Figure 8:
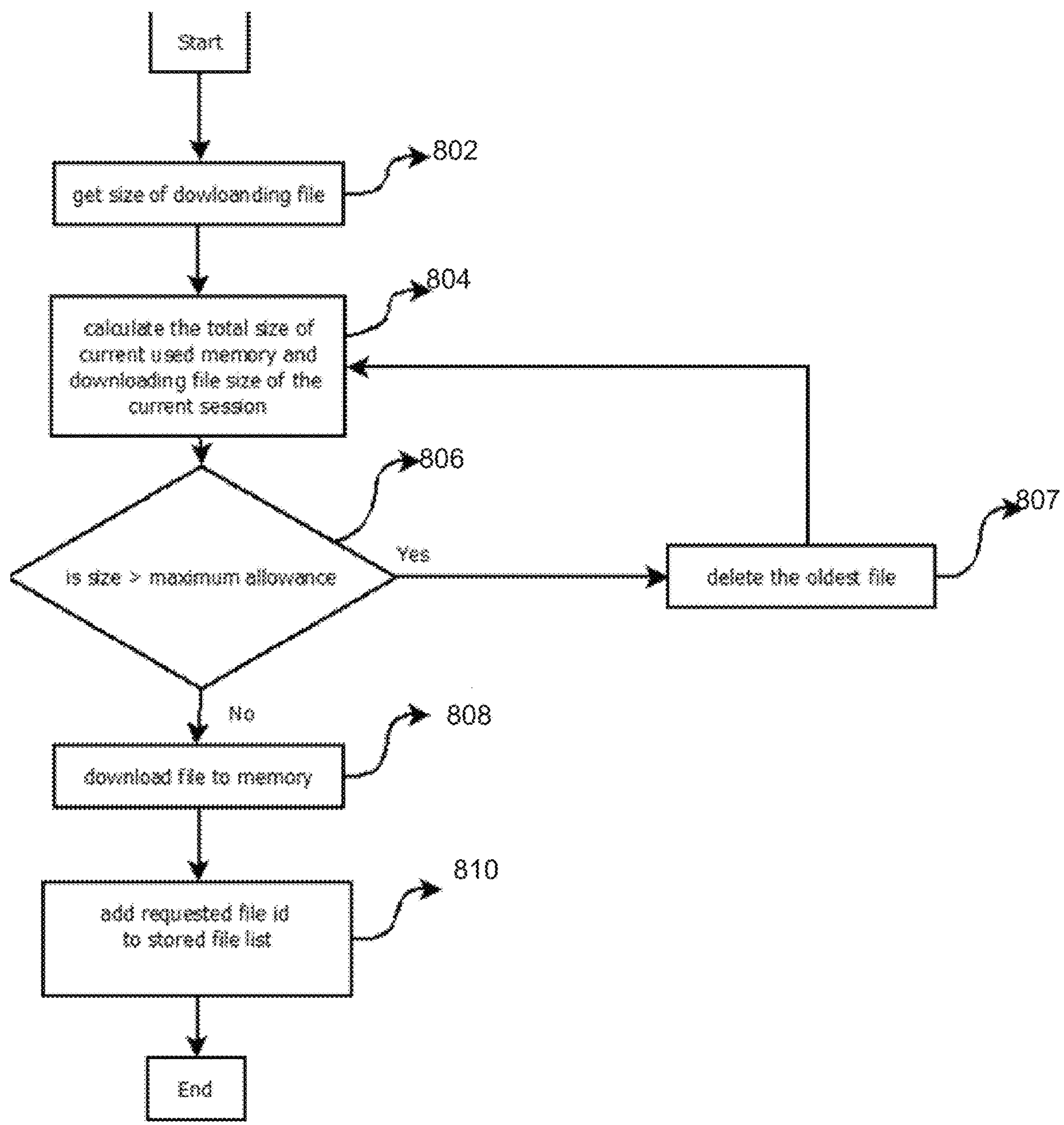
FIG. 8 is a flow diagram detailing exemplary operation according to invention principles.

The flow diagram of FIG. 8 illustrates the above process. This operation occurs in response to a determination that the check processor makes indicating that no file is cached in the memory of the second server 200. In step 802, the management application acquires from the third server 300, a total size of the data file that is requested by the user. In step 804, the management application calculates the sum of total size of current used memory of the current session and the total size of the subsequent file to be downloaded from the third server. In step 806, a determination is made whether the sum of the total size of currently used memory and total size of the file to be acquired from the third server is greater than the maximum allowance that is set the application. If the result of the determination of 806 is positive, the management application deletes the oldest file from memory. If the result of the determination is negative, the management application 204 downloads the file from the third server, updates a total size of currently used memory, associates this file with the session information and stores both sets of information in memory in step 808. In step 810, the management application 204 adds the requested file ID to a list of stored file IDs associated with the current communication session along with date values for the requested file.

Another manner in which the management application 204 may manage the multiple files includes tracking the total size of the used memory and the size of available memory. Each session can use any amount of available memory up to the maximum size of available memory. The management application 204 further tracks a list of files that paired with the session id and when the available memory is less than the size of downloading file, the server deletes file from the beginning of the list until the available memory is large than the size of downloading file and then downloads the new file.

Figure 9:
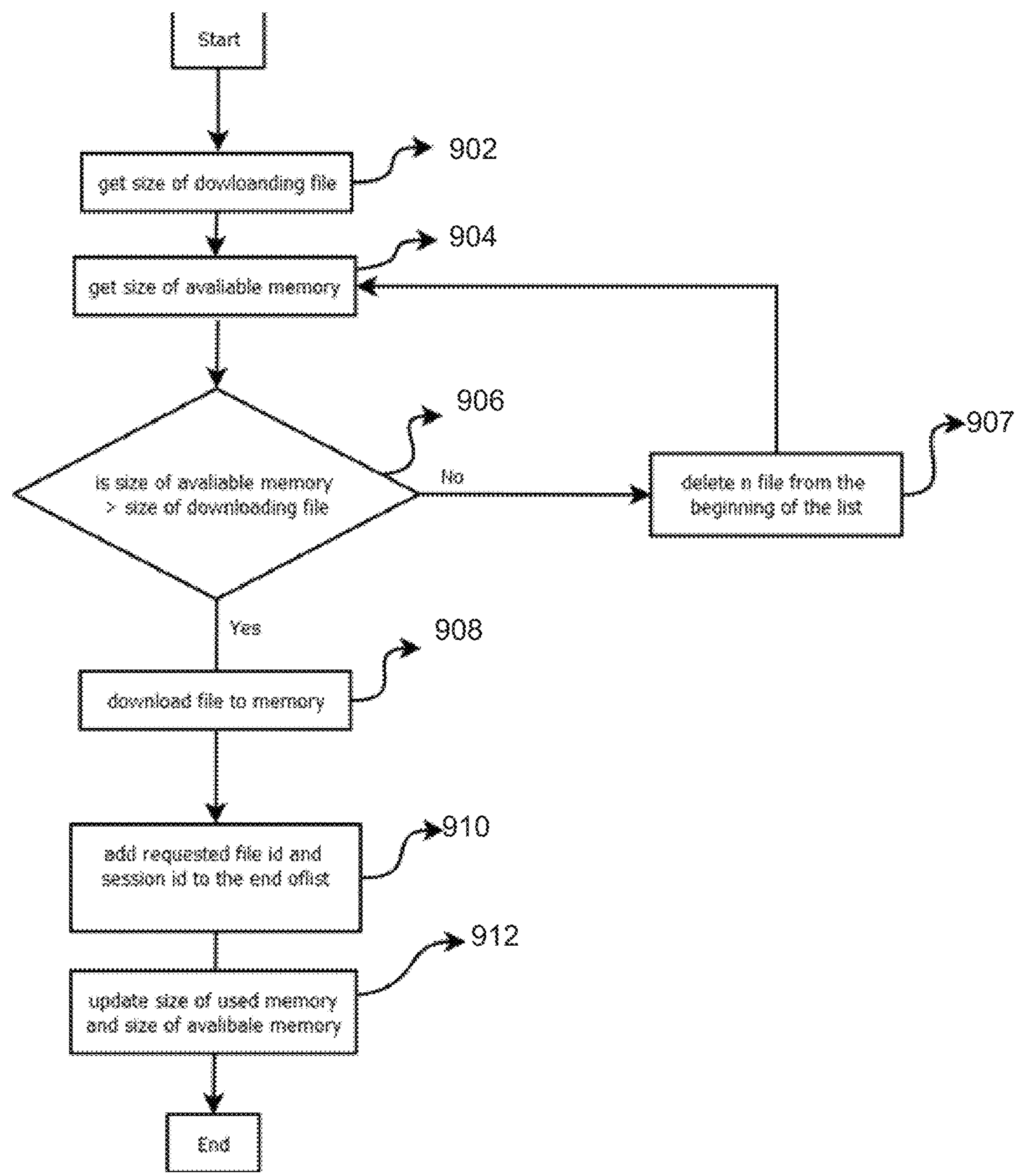
FIG. 9 is a flow diagram detailing exemplary operation according to invention principles.

FIG. 9 illustrates this alternative manner for managing multiple file requests and downloads by the management application. In step 902, the management application acquires a size of the file being requested by the image processing device from the third server. In step 904, the management application acquires a size of available memory from the current server session. In step 906, a determination is made whether the size of available memory is greater than the size of file to be downloaded from the third server. If the result of the determination in step 906 is negative, the management application deletes n file(s) from the beginning of the list. This list is maintained in the server session with session id, file id and file location. The number n can be predefined based on the server capability. If the result of the determination in step 906 is positive, the management application 204 downloads the requested file from the third server into memory 206 in step 908. In step 910, the management application 204 adds requested file id, file location and session id to the end of the list and updates the size of used memory and size of available memory in step 912.

The above description serves to explain principles of the invention; but the invention should not be limited to the examples described above. For example, the order and/or timing of some of the various operations may vary from the examples given above without departing from the scope of the invention. Further by way of example, the type of network and/or servers may vary from the examples given above without departing from the scope of the invention. Other variations from the above-recited examples may also exist without departing from the scope of the invention.

The scope of the present invention includes a non-transitory computer-readable medium storing instructions that, when executed by one or more processors, cause the one or more processors to perform one or more embodiments of the invention described herein. Examples of a computer-readable medium include a hard disk, a floppy disk, a magneto-optical disk (MO), a compact-disk read-only memory (CD-ROM), a compact disk recordable (CD-R), a CD-Rewritable (CD-RW), a digital versatile disk ROM (DVD-ROM), a DVD-RAM, a DVD-RW, a DVD+RW, magnetic tape, a nonvolatile memory card, and a ROM. Computer-executable instructions can also be supplied to the computer-readable storage medium by being downloaded via a network.

While the present invention has been described with reference to exemplary embodiments, it is to be understood that the invention is not limited to the disclosed exemplary embodiments.

We claim:

1. A server comprising:

a memory storing instructions; and at least one processor that executes the instructions stored in the memory to control the at least one processor to perform operations comprising receiving, from an image processing device, a request indicating a data file stored on a file server and processing to be performed on the data file;

determining whether the memory stores information associated with a current session between the image processing device and the server, the information identifying a location in the memory where the data file is stored and a location in the memory where a modified version of the data file is stored;

based on the determination determining that the memory stores the information, providing the modified version to the image processing device if the processing included in the request is preview processing and providing the downloaded file to the image processing device if the processing in the request is the print processing; and based on the determination determining that the information is not stored in the memory, initiating a download of the data file from the file server, generating a modified version of the downloaded data file and providing the modified version to the image processing device if the processing included in the request is preview processing and providing the downloaded file to the image processing device if the processing included in the request is print processing, and causing the memory to store the information associated with the current session.

2. The server according to claim 1, wherein execution of the instructions further comprises deleting at least one of the data file and the modified version of the data file during the session between the image processing device in response to (a) receiving a further request from the image processing device for a further data file and (b) upon completion of the processing.

3. The server according to claim 1, wherein the print processing provides a full version of the downloaded data file to the image processing device for output thereof; and the preview processing is a print preview process and the modified version of the data file is a thumbnail including an amount of data less than the full version of the requested data file.

4. The server according to claim 1, wherein in response to completion of the preview processing, a request for the print processing is selectively completed during a same session without re-downloading the requested file from the file server.

5. The server according to claim 1, wherein the file server is external from the server and includes a resource providing application that provides one or more requested files to the server in response to the request received from the image processing device based on user credentials received from the image processing device.

6. The server according to claim 1, wherein execution of the instructions further comprises managing requests for multiples data files received from the image processing device using session configuration information identifying a maximum allowance value for each session, the maximum allowance value representing a maximum number of files per session and a maximum size per file.

7. The server according to claim 6, wherein the maximum allowance values is dynamically determined based on the maximum number of simultaneous requests permitted by the server and a size of the memory allocated to storing data files.

8. The server according to claim 1, wherein execution of the instructions further comprises managing requests for multiples data files received from the image processing device by tracking a list of data files associated with the session and, in a case where the available memory is less than a size of the requested file, deleting one or more files based on an earliest request time until the available memory is larger than a size of the requested file, and in a case where the available memory is greater than a size of the requested file, maintaining, in memory, all previously requested files and downloading the requested file.

9. A method executed by a server including a memory and in communication with an image processing device and a file server, the method comprising:

receiving, from an image processing device, a request indicating a data file stored on a file server and processing to be performed on the data file;

determining whether the memory stores information associated with a current session between the image processing device and the server, the information identifying a location in the memory where the data file is stored and a location in the memory where a modified version of the data file is stored;

based on the determination determining that the memory stores the information, providing the modified version to the image processing device if the processing included in the request is preview processing and providing the downloaded file to the image processing device if the processing in the request is the print processing; and based on the determination determining that the information is not stored in the memory, initiating a download of the data file from the file server, generating a modified version of the downloaded data file and providing the modified version to the image processing device if the processing included in the request is preview processing and providing the downloaded file to the image processing device if the processing included in the request is print processing, and causing the memory to store the information associated with the current session.

10. The method according to claim 9, further comprising deleting at least one of the data file and the modified version of the data file during the session between the image processing device in response to (a) receiving a further request from the image processing device for a further data file and (b) upon completion of the processing.

11. The method according to claim 9, wherein the print processing provides a full version of the downloaded data file to the image processing device for output thereof; and the preview processing is a print preview process and the modified version of the data file is a thumbnail including an amount of data less than the full version of the requested data file.

12. The method according to claim 9, further comprising in response to completion of the preview processing, completing a request for the second type of processing during a same session without re-downloading the requested file from the file server.

13. The method according to claim 9, wherein the file server is external from the server and includes a resource providing application that provides one or more requested files to the server in response to the request received from the image processing device based on user credentials received from the image processing device.

14. The method according to claim 9, further comprising managing requests for multiples data files received from the image processing device using session configuration information identifying a maximum allowance value for each session, the maximum allowance value representing a maximum number of files per session and a maximum size per file.

15. The method according to claim 14, wherein the maximum allowance values is dynamically determined based on the maximum number of simultaneous requests permitted by the server and a size of the memory allocated to storing data files.

16. The method according to claim 9, further comprising managing requests for multiples data files received from the image processing device by tracking a list of data files associated with the session and, in a case where the available memory is less than a size of the requested file, deleting one or more files based on an earliest request time until the available memory is larger than a size of the requested file, and in a case where the available memory is greater than a size of the requested file, maintaining, in memory, all previously requested files and downloading the requested file.

17. A non-transitory computer readable storage medium storing instructions that, when executed by at least one processor, controls a server including a memory in communication with an image processing device and a file server to perform operations comprising:

receiving, from an image processing device, a request indicating a data file stored on a file server and processing to be performed on the data file;

determining whether the memory stores information associated with a current session between the image processing device and the server, the information identifying a location in the memory where the data file is stored and a location in the memory where a modified version of the data file is stored;

based on the determination determining that the memory stores the information, providing the modified version to the image processing device if the processing included in the request is preview processing and providing the downloaded file to the image processing device if the processing in the request is the print processing; and based on the determination determining that the information is not stored in the memory, initiating a download of the data file from the file server, generating a modified version of the downloaded data file and providing the modified version to the image processing device if the processing included in the request is preview processing and providing the downloaded file to the image processing device if the processing included in the request is print processing, and causing the memory to store the information associated with the current session.

* * * * *